US008867515B2

(12) United States Patent
Duman

(10) Patent No.: US 8,867,515 B2
(45) Date of Patent: Oct. 21, 2014

(54) TRANSMITTING OR RECEIVING DATA VIA CODE DIVISION MULTIPLE ACCESS USING HIGHLY CORRELATED SPREADING CODES ASSIGNED TO A USER

(75) Inventor: Tolga M. Duman, Chandler, AZ (US)

(73) Assignee: Empire Technology Development LLC, Wilmington, DE (US)

( * ) Notice: Subject to any disclaimer, the term of this patent is extended or adjusted under 35 U.S.C. 154(b) by 233 days.

(21) Appl. No.: 13/503,624

(22) PCT Filed: May 19, 2011

(86) PCT No.: PCT/US2011/037198
§ 371 (c)(1),
(2), (4) Date: Apr. 23, 2012

(87) PCT Pub. No.: WO2012/158173
PCT Pub. Date: Nov. 22, 2012

(65) Prior Publication Data
US 2012/0320900 A1    Dec. 20, 2012

(51) Int. Cl.
*H04B 7/216*    (2006.01)
*H04L 1/00*    (2006.01)
*H04L 5/00*    (2006.01)

(52) U.S. Cl.
CPC ............. *H04L 1/0056* (2013.01); *H04L 5/0021* (2013.01); *H04L 1/0048* (2013.01); *H04L 1/0042* (2013.01)
USPC ........................................................ 370/342

(58) Field of Classification Search
CPC ...................................................... H04B 1/707
USPC ........................................................ 370/342
See application file for complete search history.

(56) References Cited

U.S. PATENT DOCUMENTS

| 7,088,673 B2 * | 8/2006 | Horne ........................ 370/209 |
| 7,779,326 B2 | 8/2010 | Stankovic et al. |
| 2003/0012126 A1 * | 1/2003 | Sudo .......................... 370/203 |
| 2003/0156562 A1 | 8/2003 | Zeira et al. |

FOREIGN PATENT DOCUMENTS

| WO | WO 03009488 A2 * | 1/2003 |
| WO | 2008062163 A2 | 5/2008 |
| WO | WO 2008062163 A2 * | 5/2008 |

OTHER PUBLICATIONS

Wikipedia, Code division multiple access, last edited on Nov. 11, 2010, accessed online on Apr. 9, 2012 via http://en.wikipedia.org/w/index.php?oldid=396221424.
Stankovic, V., et al., On code design for Slepian-Wolf problem and lossless multiterminal networks, IEEE Transactions on Information Theory, Apr. 2006, vol. 52, issue 4, pp. 1495-1507.

(Continued)

*Primary Examiner* — Mark Rinehart
*Assistant Examiner* — Maharishi Khirodhar
(74) *Attorney, Agent, or Firm* — Brundidge & Stanger, P.C.

(57) ABSTRACT

Examples are disclosed to transmit data from a CDMA transmitter. The data may be transmitted by encoding a first portion of the data and encoding a second portion of data. The first encoded portion of data may be spread based on a first spreading code and the second encoded portion of data may be spread based on a second spreading code. The first spreading code and the second spreading code may be highly correlated to each other. The spread first encoded portion of data may be combined with the spread second encoded portion of data to generate a chip-block. The chip-block may then be wirelessly transmitted.

19 Claims, 7 Drawing Sheets

(56) References Cited

OTHER PUBLICATIONS

Cosovic, I., et al., Time division duplex MC-CDMA for next generation mobile radio systems, 10 Telecommunications forum TELFOR'2002, Belgrade, Yugoslavia, Nov. 26-28, 2002, accessed on Apr. 9, 2012 via http://newsky-fp6.eu/People/Cosovic/papers/telfor_tdd.pdf.

Australian Patent Office, International Search Report and Written Opinion of the International Searching Authority for PCT/US20111037198, mailed on Jun. 30, 2001.

* cited by examiner

600 A computer program product.

602 A signal bearing medium.

604 instructions for receiving data at a receiver configured to receive via code division multiple access, which, when executed by logic, cause the logic to:

receive a chip-block that includes a first encoded portion of data and a second encoded portion of data that have been spread based on a first spreading code and a second spreading code, wherein the first spreading code and the second spreading are highly correlated to each other;

de-spread the first encoded portion of data using the first spreading code;

de-spread the second encoded portion of data using the second spreading code;

decode a first portion of data included in the first encoded portion of data; or decode a second portion of data included in the second encoded portion of data, wherein the first portion of data and the second portion of data are decoded based, at least in part, on a correlation coefficient associated with the highly correlated first and second spreading codes.

| 606 a computer-readable medium. | 608 a recordable medium. | 610 a communications medium. |

FIG. 6

TRANSMITTING OR RECEIVING DATA VIA CODE DIVISION MULTIPLE ACCESS USING HIGHLY CORRELATED SPREADING CODES ASSIGNED TO A USER

BACKGROUND

Unless otherwise indicated herein, the approaches described in this section are not prior art to the claims in this application and are not admitted to be prior art by inclusion in this section.

Deployment of a wireless communication channel that employs code division multiple access (CDMA) may include N users. Each of the N users may utilize a length G spreading code to transmit data and/or information over the wireless communication channel. In a simplified example, it may be assumed that the spreading codes used by the N users are nearly orthogonal. For this simplified example, the N users may employ a coding scheme such as binary phase shift keying (BPSK). A conventional CDMA transmission may multiply a "bit waveform" with a "code sequence waveform" to spread a narrowband signal for each individual user ("i-th user") over an overall bandwidth that is G times wider. At the receiver, superposition of all N users' signals may be observed (through multipath fading and noise). In a case where a single-user receiver is employed: the receiver may decode data/information of the i-th user by de-spreading a received waveform using the i-th user's spreading code, obtain a waveform corresponding to a transmitted bit for the i-th user, and make a decision on the i-th user bit alone by a single-user detector. Since the spreading codes are nearly orthogonal for different users, the single-user detector may detect little to no interference and a simple decision rule may apply. However, the number of nearly orthogonal spreading codes is limited (e.g., dictated by an amount of spreading/available bandwidth for transmission).

SUMMARY

The present disclosure describes example methods to be implemented for a user to transmit data from a transmitter configured to transmit via CDMA. The methods may include encoding a first portion of data and encoding a second portion of data. The first encoded portion of data may be spread based on a first spreading code and the second encoded portion of data may be spread based on a second spreading code. In some examples, the first spreading code and the second spreading code may be highly correlated to each other. The spread first encoded portion of data may be combined with the spread second encoded portion of data to generate a chip-block. The chip-block may then be wirelessly transmitted.

The present disclosure also describes example methods to be implemented for receiving data at a receiver configured to receive via CDMA. The methods may include receiving a chip-block that includes a first encoded portion of data and a second encoded portion of data that have been spread based on a first spreading code and a second spreading code. In some examples, the first spreading code and the second spreading code may be highly correlated to each other. The first encoded portion of data may be de-spread using the first spreading code and the second encoded portion of data may be de-spread using the second spreading code. Also, a first portion of data included in the first encoded portion of data and a second portion of data included in the second encoded portion of data may both be decoded. The first portion of data and the second portion of data may be decoded based, at least in part, on a correlation coefficient associated with the highly correlated first and second spreading codes.

The present disclosure also describes example devices receiving data at a receiver configured to receive via CDMA. The example devices may have a receive manager that has logic. The logic may be configured to receive a chip-block that includes a first encoded portion of data and a second block of symbols that have been spread based on a first spreading code and a second spreading code. The first spreading code and the second spreading code may be highly correlated to each other. The logic may also be configured to de-spread the first encoded portion of data using the first spreading code and de-spread the second encoded portion of data using the second spreading code. The logic may also be configured to decode a first portion of data included in the first encoded portion of data and decode a second portion of data included in the second encoded portion of data. In some examples, the first portion of data and the second portion of data may be decoded based, at least in part, on a correlation coefficient associated with the highly correlated first and second spreading codes.

The present disclosure also describes example systems for a user to transmit data from a transmitter configured to transmit via CDMA. The example systems may include an antenna and a transmit manager. The transmit manager may have logic configured to encode a first portion of data and encode a second portion of data. The logic may also be configured to spread the first encoded portion of data based on a first spreading code and spread the second encoded portion of data based on a second spreading code. In some examples, the first spreading code and the second spreading code may be highly correlated to each other. The logic may further be configured to combine the spread first encoded portion of data with the spread second encoded portion of data to generate a chip-block and then to initiate a transmission of the chip-block via the antenna.

The present disclosure also describes example computer program products. In some examples, the computer program products may include a signal bearing medium having instructions receiving data at a receiver configured to receive via code division multiple access. The instructions, which, when executed by logic may cause the logic to receive a chip-block that includes a first encoded portion of data and a second encoded portion of data that have been spread based on a first spreading code and a second spreading code. Responsive to the received chip-block, the instructions may also cause the logic to de-spread the first encoded portion of data using the first spreading code and de-spread the second encoded portion of data using the second spreading code. The instructions may then cause the logic to decode a first portion of data included in first encoded portion of data and decode a second portion of data included in the second encoded portion of data. In some examples, the first portion of data and the second portion of data may be decoded based, at least in part, on a correlation coefficient associated with the highly correlated first and second spreading codes The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 illustrates a block diagram of an example computer program product; and

DETAILED DESCRIPTION

Figure 1:
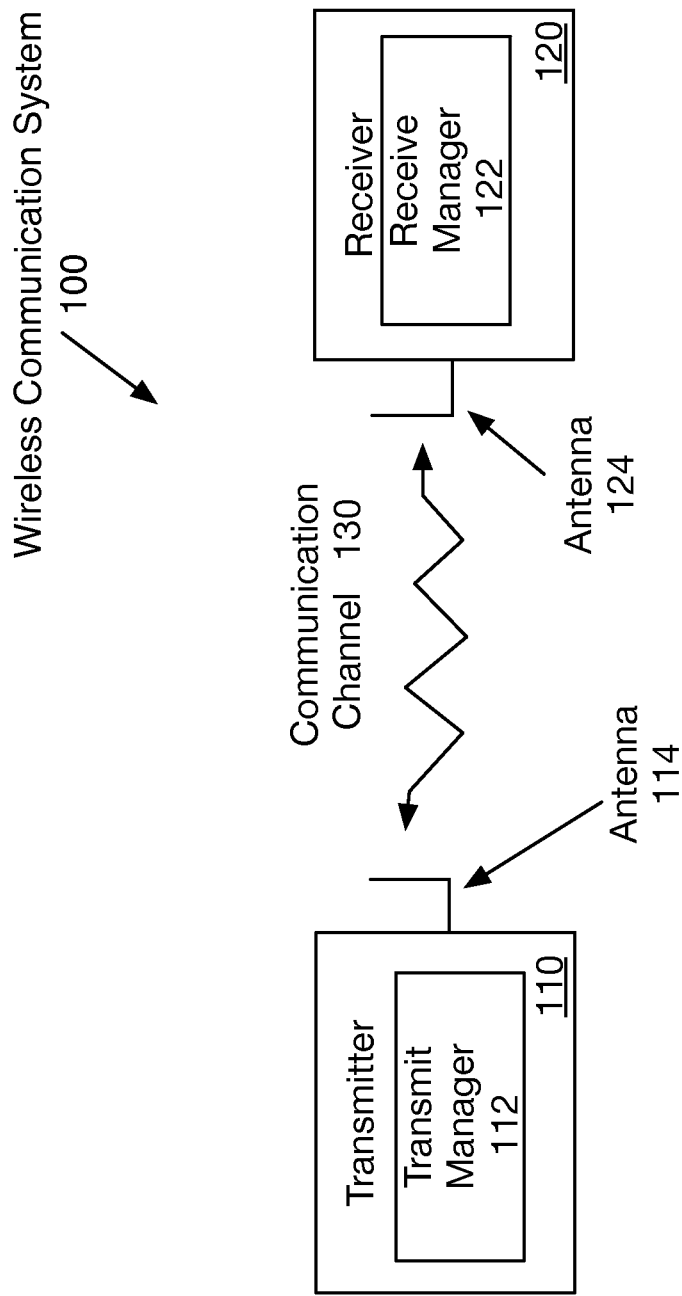
FIG. 1 illustrates an example wireless communication system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to transmitting or receiving data via code division multiple access using highly correlated spreading codes assigned to a user.

As contemplated in the present disclosure, the number of nearly orthogonal spreading codes is limited in a wireless communication system that employs CDMA. For example, if orthogonal spreading codes are strictly imposed, a number of spreading codes is limited by the number of users N. Also, lessening restrictions for orthogonality of the spreading codes to increase numbers of users beyond N may increase observable interference at the receiver to an unacceptable level. The unacceptable level of observable interference may be problematic to the wireless communication system working properly.

Also, wireless communication systems that employ CDMA may want to increase transmission capabilities for separate users. One method to increase transmission capabilities is to assign n spreading codes to each user. If n spreading codes are assigned to a given user, transmission capabilities for the given user may be increased by a factor of n. In some examples, strict orthogonality between each spreading code may be imposed to avoid unacceptably high interference. However, the number of total users in a wireless communication system may have to be reduced accordingly. For example, n spreading codes for each user may be provided and the wireless system may be limited to N/n users.

In some examples, methods are implemented for a user to transmit data from a transmitter configured to transmit via CDMA. The methods may include encoding a first portion of data and encoding a second portion of data. The first encoded portion of data may be spread based on a first spreading code and the second encoded portion of data may be spread based on a second spreading code. In some examples, the first spreading code and the second spreading code may be highly correlated to each other. The spread first encoded portion of data may be combined with the spread second encoded portion of data to generate a chip-block. The chip-block may then be wirelessly transmitted.

In some other examples, methods are implemented for receiving data at a receiver configured to receive via CDMA. The methods may include receiving a chip-block that includes a first encoded portion of data and a second encoded portion of data that have been spread based on a first spreading code and a second spreading code. In some examples, the first spreading code and the second spreading code may be highly correlated to each other. The encoded portion of data may be de-spread using the first spreading code and the second encoded portion of data may be de-spread using the second spreading code. Also, a first portion of data included in the first encoded portion of data and a second portion of data included in the second encoded portion of data may both be decoded. The first portion of data and the second portion of data may be decoded based, at least in part, on a correlation coefficient associated with the highly correlated first and second spreading codes.

FIG. 1 illustrates an example wireless communication system 100. As shown in FIG. 1, wireless communication system 100 includes a transmitter 110 and a receiver 120. In some examples, the elements of wireless communication system 100 may be coupled via one or more communication channels. As depicted in FIG. 1 these one or more communication channels may include communication channel 130 that may communicatively couple transmitter 110 to receiver 120.

In some examples, wireless communication system 100 may operate using code division multiple access (CDMA). As shown in FIG. 1, transmitter 110 may include a transmit manager 112 and an antenna 114. Transmit manager 112 may include logic and/or features configured to at least initiate transmission of data (e.g., in a chip-block) through antenna 114 and over communication channel 130 to receiver 120. Also, as shown in FIG. 1, receiver 120 may include a receive manager 122 and an antenna 124. Receive manager 122 may include logic and/or features configured to receive the data (e.g., in a chip-block) transmitted over communication channel 130 to receiver 110 and captured/obtained through antenna 124.

According to some examples, transmitter 110 may be associated with a user from among N users that may communicate over communication channel 130 in wireless communication system 100. The user may be assigned a code group having spreading codes. In some examples, the spreading codes of the code group may be highly correlated (e.g., strongly interfere with each other). Other users from among N users may also be separately assigned to other respective code groups. Each of the other respective code groups may also separately include spreading codes that may be highly correlated. However, for these examples, the spreading codes included in the code group assigned to the user and the spreading codes separately include in each of the other code groups may be substantially orthogonal to each other. As a result of the spreading codes for the code group being substantially orthogonal to other spreading codes in other code groups, the user may transmit data over communication channel 130 with little to no interference from the other users that may also be transmitting data over communication channel 130 using their respective spreading codes.

In some examples, transmitter 110 may utilize the spreading codes included in the code group assigned to the user to increase data throughput, bandwidth or transmission capabilities. The spreading codes included in the code group, for example, may include a first spreading code and a second spreading code. As mentioned above, the spreading codes may be highly correlated to each other. For these examples, transmit manager 112 of transmitter 110 may include logic and/or features to encode data to be wirelessly transmitted to receiver 120 over communication channel 130. Transmit manager 112 may encode a first portion of the data and may encode a second portion of the data. Transmit manager 112 may then spread the first encoded portion of data based on the first spreading code and spread the second encoded portion of data based on the second spreading code. The spread first encoded portion of data may then be combined (e.g., via superimposing) with the spread second encoded portion of data to generate a chip-block. The chip-block may then be wireless transmitted through antenna 114 over communication channel 130 to receiver 120.

According to some examples, since two portions of data have been encoded, spread and combined to be transmitted in one chip-block, the data throughput though antenna 114 over communication channel 130 may have been effectively doubled. Also, two data channels corresponding to the first and second spreading codes may be similar to two data channels separately transmitted from two antennas such as in a transmission side of a multiple-in-multiple-out (MIMO) wireless communication system. In some examples, transmit manager 112 may include logic and/or features to implement various MIMO coding techniques. The various MIMO coding techniques may include, but are not limited to, space-time block codes, space-time trellis codes, layered space-time codes, concatenated codes, unitary space-time codes or differential space-time codes.

According to some examples, receiver 120 may receive the chip-block wirelessly transmitted from transmitter 110. For these examples, receive manager 122 of receiver 120 may include logic and/or features to de-spread the first and second encoded portions of data included in the chip-block. Receive manager 122 may de-spread the first encoded portion of data using the first spreading code and may also de-spread the second encoded portion of data using the second spreading code. A first portion of data included in the first encoded portion of data as well as a second portion of data included in the second encoded portion of data may then be decoded. As described more below, in some examples, receive manager 122 may decode the first and second portions of data based, at least in part, on a correlation coefficient associated with the highly correlated first and second spreading codes.

The decoding of the first and second portions of data based on the correlation coefficient associated with the highly correlated first and second spreading codes may involve receive manager 122 including logic and/or features to first obtain a de-spread version of transmitted signals as illustrated in example equation (1) as shown below for a simplified scenario of unity channel gain.

$$y_1 = x_1 + ax_2 + \text{noise and } y_2 = ax_1 + x_2 + \text{noise} \quad (1)$$

For example equation (1), $y_1$ may represent a first data channel and $y_2$ may represent a second data channel as observed by receive manager 122 (after de-spreading with the first and second spreading codes). Also, $x_1$ and $x_2$ may represent the first and second portions of data, respectively. Further, "a" may represent the correlation coefficient associated with the highly correlated first and second spreading codes. Example equation (1) is provide as merely an example to illustrate a simplified way to decode portions of data based, at least in part, on a correlation coefficient associated with highly correlated spreading codes and this disclosure is not limited to only example equation (1). Also, example equation (1) assumes that channel gains for both the first and the second data channels are at unity and also does not reflect other characteristics associated with wireless communication channels via which a chip-block may be received by a receiver (e.g., receiver 120).

According to some examples, the two data channels observed by receive manager 122 may be similar to a receiver side of a MIMO wireless communication system. So, similar to the transmission side MIMO example mentioned above for transmitter 110, receive manager 122 may include logic and/or features to implement various MIMO decoding techniques. In some examples, the various MIMO decoding techniques may match or correspond to the coding techniques implemented by transmit manager 112 to encode the portions of data as mentioned above.

In some examples, wireless communication system 100 may be operated according to one or more CDMA associated wireless communication technologies. These CDMA associated wireless communication technologies may be described in one or one or more industry standards associated with the $3^{rd}$ Generation Partnership Project 2 such as CDMA-2000, EV-DO, EV-DO Rev. A or EV-DO Rev. B and may be referred to as "3GPP2" or described in an industry standard such as W-CDMA. Although this disclosure is not limited to only the above-mentioned standards and types of wireless technologies associated with CDMA.

Figure 2:
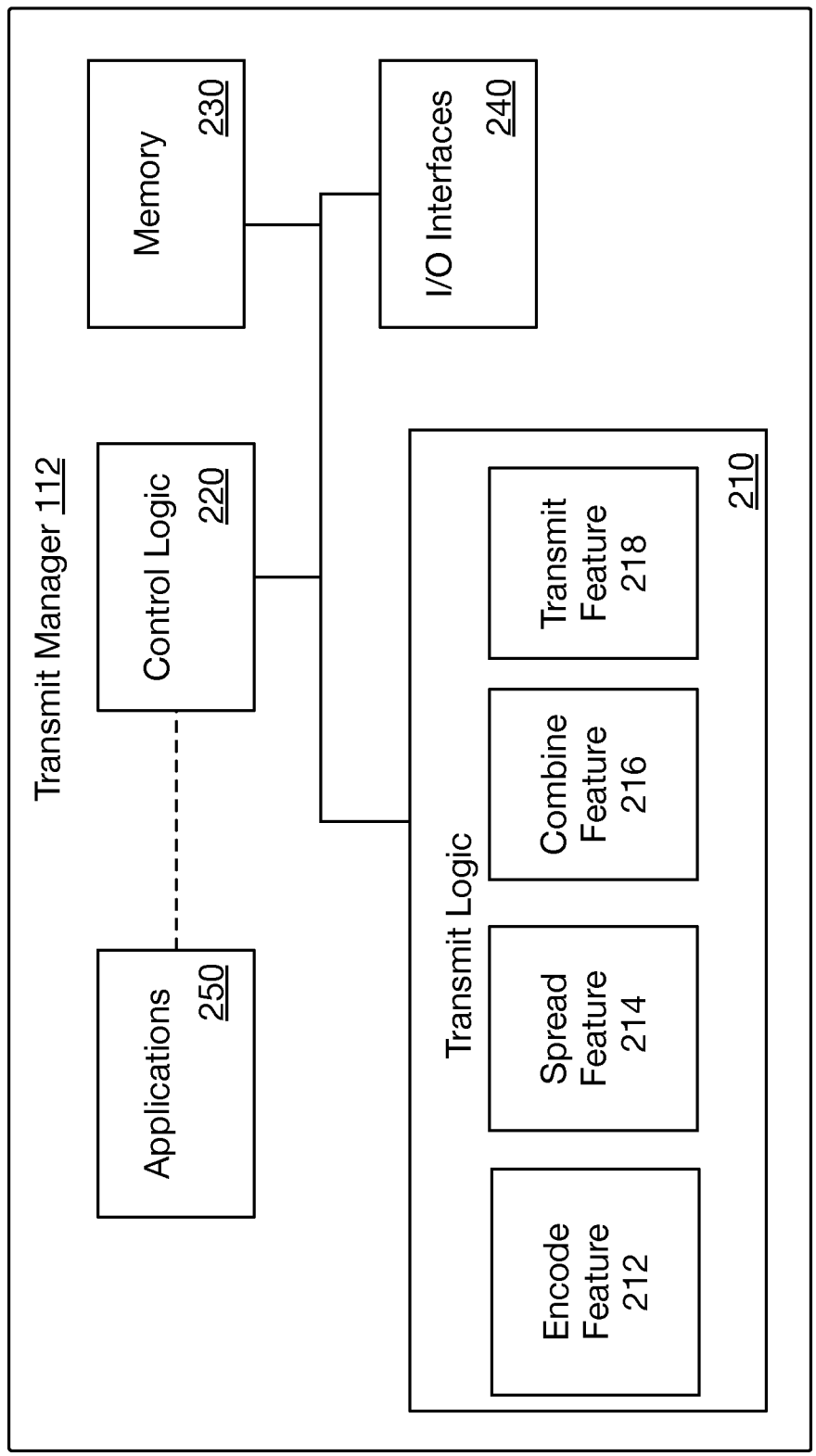
FIG. 2 illustrates a block diagram of an example architecture for a transmit manager.

FIG. 2 illustrates a block diagram of an example architecture for a transmit manager 112. As described above for wireless communication system 100 in FIG. 1, transmitter 110 may include a transmit manager 112. In some examples, transmit manager 112 includes features and/or logic configured or arranged for a user to transmit data from transmitter 110 that may be configured to transmit data through antenna 114 and over communication channel 130 via use of CDMA.

The example transmit manager 112 of FIG. 2, includes transmit logic 210, control logic 220, memory 230, input/output (I/O) interfaces 240 and optionally one or more applications 250. As illustrated in FIG. 2, transmit logic 210 is coupled to control logic 220, memory 230 and I/O interfaces 240. Also illustrated in FIG. 2, the optional applications 250 are arranged in cooperation with control logic 220. Transmit logic 210 may further include one or more of an encode feature 212, a spread feature 214, a combine feature 216, or a transmit feature 218, or any reasonable combination thereof.

In some examples, the elements portrayed in FIG. 2's block diagram are configured to support or enable transmit manager 112 as described in this disclosure. A given transmit manager 112 may include some, all or more elements than those depicted in FIG. 2. For example, transmit logic 210 and control logic 220 may separately or collectively represent a wide variety of logic device(s) to implement the features of transmit manager 112. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, transmit logic 210 includes one or more of an encode feature 212, a spread feature 214, a combine feature 216, or a transmit feature 218. Transmit logic 210 may be configured to use one or more of these features to perform operations. As described in more detail below, example operations may include transmitting data from a transmitter via use of CDMA.

In some examples, control logic 220 may be configured to control the overall operation of transmit manager 112. As mentioned above, control logic 220 may represent any of a wide variety of logic device(s) configured to operate in conjunction with executable content or instructions to implement the control of transmit manager 112. In some alternate examples, the features and functionality of control logic 220 may be implemented within transmit logic 210.

According to some examples, memory 230 is arranged to store executable content or instructions. The executable content or instructions may be used by control logic 220 and/or transmit logic 210 to implement or activate features or elements of transmit manager 112. As described more below, memory 230 may also be arranged to temporarily maintain information associated with spreading codes used to spread encoded data or information associated with coding techniques (e.g., MIMO coding techniques).

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between a transmit manager 112 and elements resident on or located with transmitter 110. I/O interfaces 240 may include interfaces that operate according to various communication protocols to communicate over the internal communication link (e.g., Inter-Integrated Circuit ($I^2C$), System Management Bus (SMBus) or Serial Peripheral Interface Bus (SPI), etc.). I/O interfaces 240 may also provide an interface between transmit manager 112 and elements remote to transmitter 110. For example, as mentioned above for FIG. 1, transmitter 110 may couple to receiver 120 via communication channel 130. The I/O interfaces 240, for example, include an interface configured to operate according to various wireless communication protocols to allow transmit manager 112 to communicate over these communication channels (e.g., W-CDMA, CDMA-2000, EV-DO, etc.).

In some examples, transmit manager 112 includes one or more applications 250 to provide instructions to control logic 220 and/or transmit logic 210. Instructions, for example, may include instructions for transmit manager 112 to implement or use one or more of an encode feature 212, a spread feature 214, a combine feature 216, or a transmit feature 218.

Figure 3:
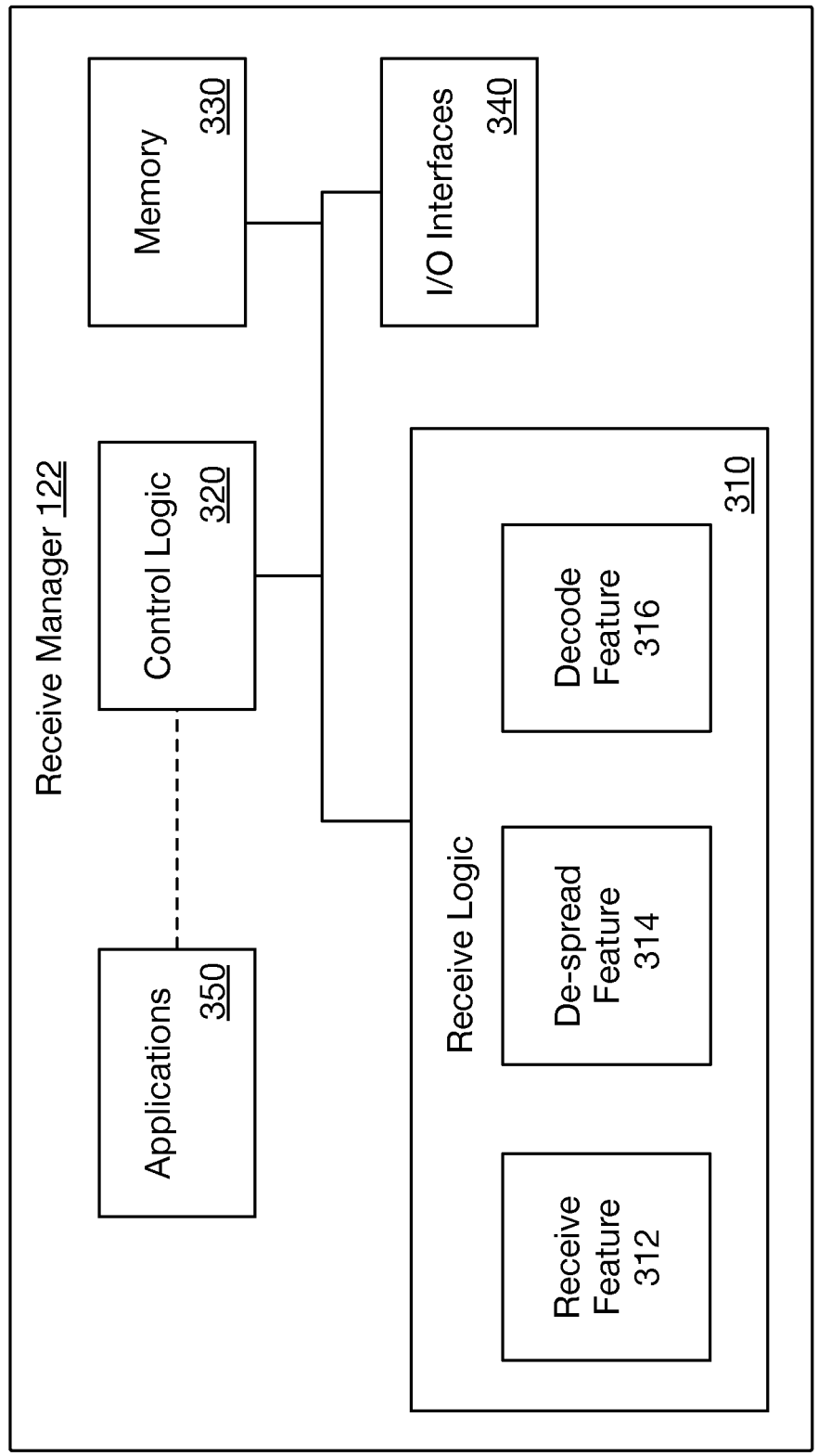
FIG. 3 illustrates a block diagram of an example architecture for a receive manager.

FIG. 3 illustrates a block diagram of an example architecture for a receive manager 122. As described above for wireless communication system 100 in FIG. 1, receiver 120 may include receive manager 122. In some examples, receive manager 122 includes features and/or logic configured or arranged for receiving data at receiver 120 that may be configured to receive the data via CDMA.

The example receive manager 122 of FIG. 3 includes receive logic 310, control logic 320, memory 330, input/output (I/O) interfaces 340 and optionally one or more applications 350. As illustrated in FIG. 3, receive logic 310 is coupled to control logic 320, memory 330 and I/O interfaces 340. Also illustrated in FIG. 3, the optional applications 350 are arranged in cooperation with control logic 320. Receive logic 310 may further include one or more of a receive feature 312, a de-spread feature 314 or a decode feature 316, or any reasonable combination thereof.

In some examples, the elements portrayed in FIG. 3's block diagram are configured to support or enable receive manager 122 as described in this disclosure. A given receive manager 122 may include some, all or more elements than those depicted in FIG. 3. For example, receive logic 310 and control logic 320 may separately or collectively represent a wide variety of logic device(s) to implement the features of receive manager 122. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 3, receive logic 310 includes one or more of a receive feature 312, a de-spread feature 314, or a decode feature 316. Receive logic 310 may be configured to use one or more of these features to perform operations. As described in more detail below, example operations may include receiving data at a receiver configured to receive via CDMA.

In some examples, control logic 320 may be configured to control the overall operation of receive manager 122. Similar to control logic 220 mentioned above, control logic 320 may represent any of a wide variety of logic device(s) configured to operate in conjunction with executable content or instructions to implement the control of receive manager 122. In some alternate examples, the features and functionality of control logic 320 may be implemented within receive logic 310.

According to some examples, memory 330 is arranged to store executable content or instructions. The executable content or instructions may be used by control logic 320 and/or receive logic 310 to implement or activate features or elements of receive manager 122. Memory 330 may also be arranged to temporarily maintain information associated with de-spreading symbol blocks using spreading codes and decoding data included in the symbol blocks based on correlation coefficients for the spreading codes. Also, information associated with coding techniques (e.g., MIMO coding techniques) may also be at least temporarily maintained in memory 330.

Memory 330 may include a wide variety of memory media including, but not limited to, one or more of volatile memory, non-volatile memory, flash memory, programmable variables or states, RAM, ROM, or other static or dynamic storage media.

In some examples, similar to I/O interfaces 240 described above, I/O interfaces 340 may provide an interface via an internal communication medium or link between receive manager 122 and elements resident on or located with receiver 120. Also similar to I/O interface 240, I/O interfaces 340 may also provide an interface between receive manager 122 and elements remote to receiver 120 (e.g., transmitter 110). For example, as mentioned above for FIG. 1, receiver 120 may couple to transmitter 110 via communication channel 130 that may operate according to various wireless communication protocols.

In some examples, receive manager 122 includes one or more applications 350 to provide instructions to control logic 320 and/or receive logic 310. Instructions, for example, may include instructions for receive manager 122 to implement or use one or more of a receive feature 312, a de-spread feature 314, or a decode feature 316.

Figure 4:
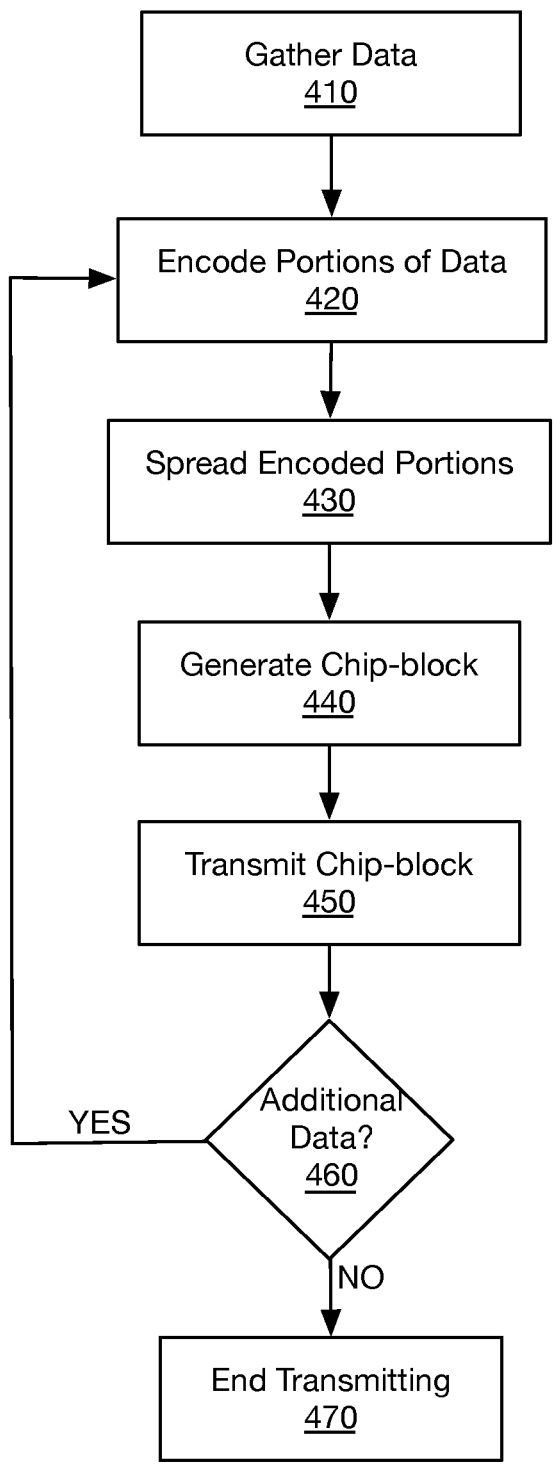
FIG. 4 illustrates a flow chart of example methods for a user to transmit data from a transmitter configured to transmit via CDMA.

FIG. 4 illustrates a flow chart of example for a user to transmit data from a transmitter (e.g., transmitter 110) configured to transmit via CDMA. In some examples, wireless communication system 100 as shown in FIG. 1 is used to illustrate example methods related to the flow chart depicted in FIG. 4. A transmit manager 112 as shown in FIG. 2 may also be used to illustrate the example methods. But the described methods are not limited to implementations on wireless communication system 100 as shown in FIG. 1 or to the transmit manager 112 shown in FIG. 2. The example methods may be implemented on other wireless communication systems having one or more of the elements depicted in FIG. 1 or FIG. 2.

Beginning at block 410 (Gather data), transmit manager 112 may include logic and/or features configured to gather data to be wirelessly transmitted (e.g., via encode feature 212). In some examples, the data may include voice, video or other types of data to be transmitted from transmitter 110 to receiver 120 via communication channel 130.

Continuing from block 410 to block 420 (Encode Portions of Data), transmit manager 112 may include logic and/or features configured to encode portions of the gathered data (e.g., via encode feature 212). The portions of data may include a first portion and a second portion. In some examples the first portion of data and the second portion of data may be encoded using a MIMO coding technique from among the MIMO coding techniques mentioned above.

Continuing from block 420 to block 430 (Spread Encoded Portions), transmit manager 112 may include logic and/or features configured to spread the first encoded portion of data using a first spreading code and spread the second encoded portion of data using a second spreading code. In some examples, the first and second spreading codes may be highly correlated to each other. Also, for these examples, the first and second spreading codes may be included in a code group assigned to a user of transmitter 110. The code group may include just the first and second spreading codes or may also include additional spreading codes based in part upon a desired data throughput for the user. So, for example, if the user desires to have a higher data throughput, then additional spreading codes may be used to spread other portions of encoded data (e.g., a third, fourth, fifth, etc. portion of encoded data). The spreading codes included in the code group may also be substantially orthogonal to other spreading codes included in other code groups assigned to other users. Thus, the portions of encoded data may be transmitted over communication channel 130 with little to no interference from other users that may be using communication channel 130 to transmit data.

Continuing from block 430 to block 440 (Generate Chip-block), transmit manager 112 may include logic and/or features configured to combine the spread first encoded portion of data with the spread second encoded portion of data to generate a chip-block (e.g., via combine feature 216). In some examples, the spread first and second encoded portions of data may be combined by superimposing the spread first encoded portion of data with the spread second encoded portion of data.

Continuing from block 440 to block 450 (Transmit Chip-block), transmit manager 112 may include logic and/or features configured to wirelessly transmit the chip-block (e.g., via transmit feature 218). In some examples, the chip-block may be wirelessly transmitted through antenna 114 and over communication channel 130 to receiver 120.

Continuing from block 450 to decision block 460 (Additional Data?), transmit manager 112 may include logic and/or features configured to determine whether additional data needs to be transmitted to receiver 110 (e.g., via transmit feature 218). If additional data needs to be transmitted, processing may move from decision block 460 to block 420. Otherwise, processing continues from decision block 460 to block 470.

Continuing from decision block 460 to block 470 (End Transmitting), the process comes to an end and transmission actions may be at least temporarily stopped.

Figure 5:
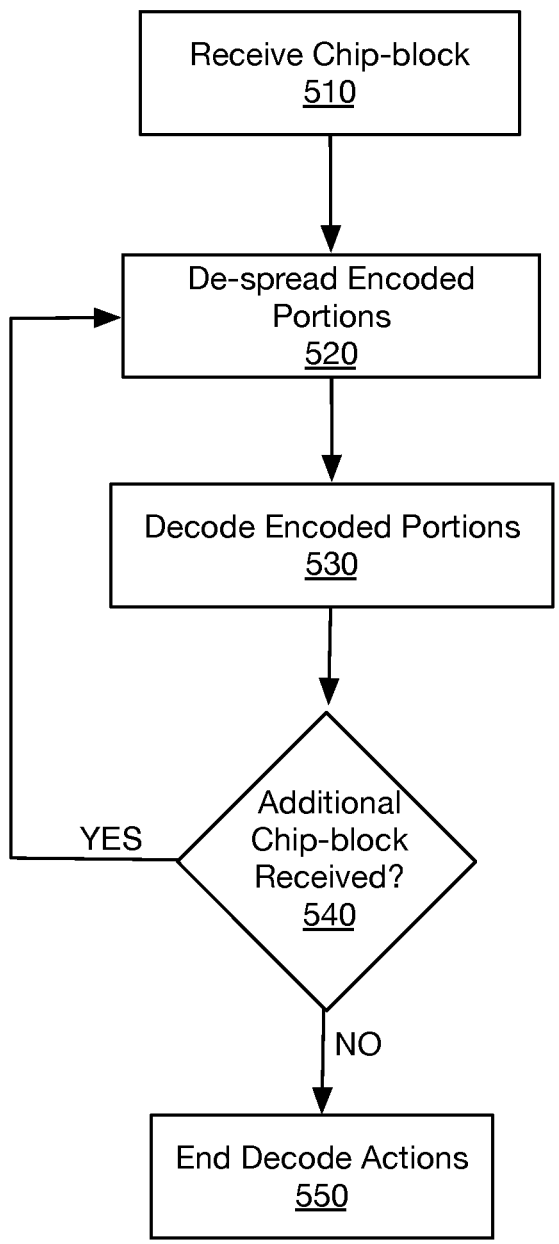
FIG. 5 illustrates a flow chart of example methods for receiving data at a receiver configured to receive via CDMA.

FIG. 5 illustrates a flow chart of example methods for receiving data at a receiver (e.g., receiver 120) configured to receive via CDMA. In some examples, wireless communication system 100 as shown in FIG. 1, is used to illustrate example methods related to the flow chart depicted in FIG. 5. A receive manager 122 as shown in FIG. 3 may also be used to illustrate the example methods. But the described methods are not limited to implementations on wireless communication system 100 as shown in FIG. 1 or to the receive manager 122 shown in FIG. 3. The example methods may be implemented on other wireless communication systems having one or more of the elements depicted in FIG. 1 or FIG. 3.

Beginning at block 510 (Receive Chip-block), receive manager 122 of wireless network 120 may include logic and/or features configured to receive a chip-block transmitted from transmitter 110 (e.g., via receive feature 312). In some examples, the chip-block may be received through antenna 124 over communication channel 130. The chip-block may include first and second encoded portions of data that have been spread based on first and second spreading codes. For these examples, the first and second spreading codes may be highly correlated to each other.

Continuing from block 510 to block 520 (De-spread Encoded Portions), receive manager 122 may include logic and/or features configured to de-spread the first and second encoded portions of data included in the chip-block (e.g., via de-spread feature 214). In some examples, receive manager 122 may de-spread the first encoded portion of data using the first spreading code and may de-spread the second encoded portion of data using the second spreading code.

Continuing from block 520 to block 530 (Decode Encoded Portions), receive manager 122 may include logic and/or features configured to decode the first and second encoded portions of data (e.g., via decode feature 216). In some examples, in order to decode the encoded portions of data, receive manager may implement a MIMO decoding technique that may match or correspond to the MIMO coding technique used by transmit manager 112 of transmitter 110 to encode the portions of data. The encoded portions of data may also be decoded based on a correlation coefficient associated with the highly correlated first and second spreading codes. For these examples, example equation (1) as described above may be implemented by receive manager 122 to further facilitate the decoding of the encoded portions of data. In some examples, the first and the second encoded portions of data may be decoded either jointly or separately.

Continuing from block 530 to decision block 540 (Additional Chip-block Received?), receive manager 122 may include logic and/or features configured to determine whether an additional chip-block has been received (e.g., via receive feature 212). In some examples, another chip-block may be received that may include additional portions of encoded data that may have been spread using the first and second spreading codes. If an additional chip-block has been received, processing may move from decision block 540 to block 520. Otherwise, processing continues from decision block 540 to block 550.

Continuing from decision block 540 to block 550 (End Decode Actions), the process comes to an end and decoding actions may be at least temporarily stopped.

FIG. 6 illustrates a block diagram of an example computer program product 600. In some examples, as shown in FIG. 6, computer program product 600 includes a signal bearing medium 602 that may also include instructions 604 for receiving data at a receiver (e.g., receiver 120) configured to receive via CDMA. Instructions 604, which, when executed by logic (e.g., receive logic 310), may cause the logic to receive a chip-block that includes a first encoded portion of data and a second encoded portion of data that have been spread based on a first spreading code and a second spreading code. In some examples, the first spreading code and the second spreading code may be highly correlated to each other. The instructions 604 may also cause the logic to de-spread the first encoded portion of data using the first spreading code and de-spread the second encoded portion of data using the second spreading code. The instructions 604 may also cause the logic to decode a first portion of data included in the first encoded portion of data and to decode a second portion of data included in the second encoded portion of data. In some examples, the first portion of data and the second portion of data are decoded based, at least in part, on a correlation coefficient associated with the highly correlated first and second spreading codes. Also, in some examples, other information such as channel state information may also be used to decode the first and second portions of data.

Also depicted in FIG. 6, in some examples, computer product 600 may include one or more of a computer readable medium 606, a recordable medium 608 and a communications medium 610. The dotted boxes around these elements depict different types of mediums included within, but not limited to, signal bearing medium 602. These types of mediums may distribute instructions 604 to be executed by logic (e.g., coverage logic 210). Computer readable medium 606 and recordable medium 608 may include, but are not limited to, a flexible disk, a hard disk drive (HDD), a Compact Disc (CD), a Digital Versatile Disk (DVD), a digital tape, a computer memory, etc. Communications medium 610 may include, but is not limited to, a digital and/or an analog communication medium (e.g., a fiber optic cable, a waveguide, a wired communication link, a wireless communication link, etc.).

Figure 7:
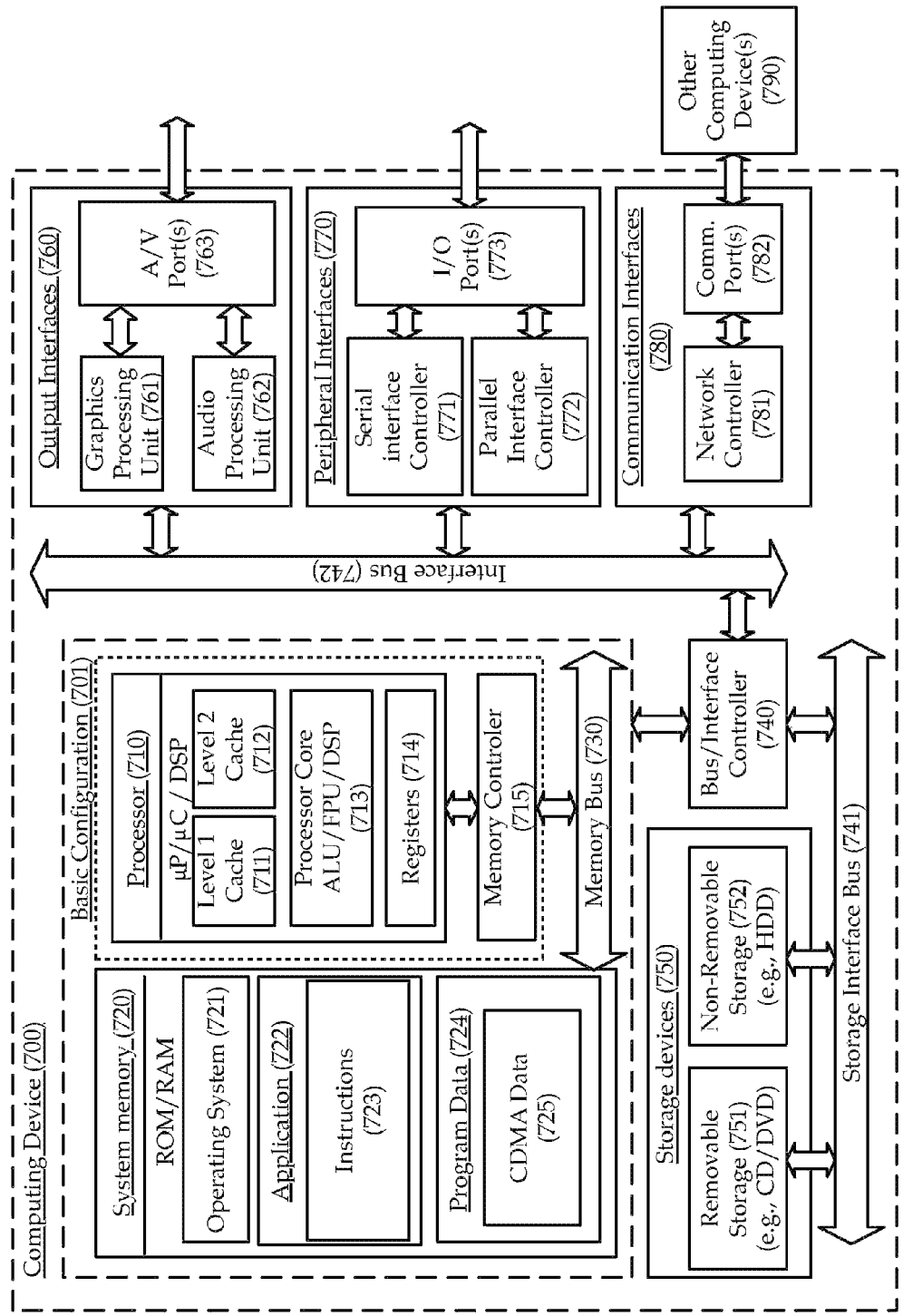
FIG. 7 illustrates an example computing device; all arranged in accordance with the present disclosure.

FIG. 7 illustrates an example computing device 700. In some examples, transmit manager 112 or receive manager 122 depicted in FIG. 1, FIG. 2 or FIG. 3 may be implemented on computing device 700. In these examples, elements of computing device 700 may be arranged or configured for transmitting or receiving data via CDMA using highly correlated spreading codes assigned to a user. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes instructions 723 that are arranged to perform the functions as described herein including the actions described with respect to transmit manager 112 architecture shown in FIG. 2, receive manager 122 architecture shown in FIG. 3 or including the actions described with respect to the flow charts shown in FIGS. 4 and 5. Program Data 724 includes CDMA data 725 that is useful for implementing instructions 723 (e.g., spreading codes, correlation coefficients, coding/decoding algorithms, etc.). In some examples, application 722 can be arranged to operate with program data 724 on an operating system 721 such that implementations for transmitting or receiving data via code division multiple access using highly correlated spreading codes assigned to a user may be provided as described herein. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 770 include a graphics processing unit 761 and an audio processing unit 762, which can be configured to communicate to various external devices such as a display or speakers via one or more A/V ports 763. Example peripheral interfaces 760 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for a user to transmit data from a transmitter configured to transmit via code division multiple access, the method comprising:
    encoding a first portion of data and encoding a second portion of data;
    spreading the first encoded portion of data based on a first spreading code and spreading the second encoded portion of data based on a second spreading code,
        wherein the first spreading code and the second spreading code are correlated to each other and are both included in a code group assigned to the user, and
        wherein a number of spreading codes are included in the code group assigned to the user, the number to be based, at least in part, on a desired data throughput for the user;
    combining the spread first encoded portion of data with the spread second encoded portion of data to generate a chip-block; and
    wirelessly transmitting the chip-block.

2. A method according to claim 1, further comprising:
    encoding a third portion of data;
    spreading the third encoded portion of data based on a third spreading code, wherein the third spreading code is correlated to both the first and the second spreading codes; and
    combining the third spread encoded portion of data with both the first spread encoded portion of data and the second spread encoded portions of data to generate the chip-block.

3. A method according to claim 1, wherein the code group assigned to the user includes spreading codes that are orthogonal to spreading codes included in one or more other code groups assigned to one or more other users.

4. A method according to claim 1, wherein the combining the spread first encoded portion of data with the spread second encoded portion of data to generate a chip-block comprises combining by superimposing the spread first encoded portion of data with the spread second encoded portion of data.

5. A method according to claim 1, wherein the encoding the first portion of data in the first encoded portion of data and the encoding the second portion of data in the second encoded portion of data comprises encoding the first and the second portions of data using one of space-time block codes, space-time trellis codes, layered space-time codes, concatenated codes, unitary space-time codes or differential space-time codes.

6. A method for receiving data at a receiver configured to receive via code division multiple access, the method comprising:
    receiving a chip-block that includes a first encoded portion of data and a second encoded portion of data that have been spread based on a first spreading code and a second spreading code,
        wherein the first spreading code and the second spreading code are correlated to each other and are both included in a code group assigned to the user, and
        wherein a number of spreading codes are included in the code group assigned to the user, the number to be based, at least in part, on a desired data throughput for the user;
    de-spreading the first encoded portion of data using the first spreading code;
    de-spreading the second encoded portion of data using the second spreading code;
    decoding a first portion of data included in the first encoded portion of data; and
    decoding a second portion of data included in the second encoded portion of data, wherein the first portion of data and the second portion of data are decoded based, at least in part, on a correlation coefficient associated with the correlated first and second spreading codes.

7. A method according to claim 6, wherein the code group assigned to the user includes spreading codes that are substantially orthogonal to spreading codes included in one or more other code groups assigned to one or more other users.

8. A method according to claim 6, wherein the decoding the first portion of data in the first encoded portion of data and the decoding the second portion of data in the second encoded portion of data comprises decoding the first and the second portions of data using a corresponding decoding algorithm for a respective coding scheme employed at transmitter that transmitted the chip-block, the decoding algorithm to include one of space-time block codes, space-time trellis codes, layered space-time codes, concatenated codes, unitary space-time codes or differential space-time codes.

9. A method according to claim 6, wherein the first and the second encoded portions of data are decoded jointly.

10. An apparatus for receiving data at a receiver configured to receive via code division multiple access, the apparatus comprising:
    a receive manager having a processor executing logic, the logic configured to:
    receive a chip-block that includes a first encoded portion of data and a second encoded portion of data that have been spread based on a first spreading code and a second spreading code,
        wherein the first spreading code and the second spreading code are correlated to each other and are both included in a code group assigned to the user, and wherein a number of spreading codes are included in the code group assigned to the user, the number to be based, at least in part, on a desired data throughout for the user:
    de-spread the first encoded portion of data using the first spreading code;
    de-spread the second encoded portion of data using the second spreading code;
    decode a first portion of data included in first encoded portion of data; and
    decode a second portion of data included in the second encoded portion of data,
    wherein the first portion of data and the second portion of data are decoded based, at least in part, on a correlation coefficient associated with the correlated first and second spreading codes.

11. An apparatus according to claim 10, wherein the code group assigned to the user includes spreading codes that are orthogonal to spreading codes included in one or more other code groups assigned to one or more other users.

12. An apparatus according to claim 10, wherein the logic configured to decode the first portion of data in the first encoded portion of data and decode the second portion of data in the second encoded portion of data comprises logic configured to decode the first and the second portions of data using one of space-time block codes, space-time trellis codes, layered space-time codes, concatenated codes, unitary space-time codes or differential space-time codes.

13. A system for a user to transmit data from a transmitter configured to transmit via code division multiple access, the system comprising:
an antenna; and
a transmit manager having a processor executing logic, the logic configured to:
encode a first portion of data in a first encoded portion of data and encode a second portion of data in a second encoded portion of data;
spread the first encoded portion of data based on a first spreading code and spread the second encoded portion of data based on a second spreading code, wherein the first spreading code and the second spreading code are correlated to each other and are both included in a code group assigned to the user, and wherein a number of spreading codes are included in the code group assigned to the user, the number to be based, at least in part, on a desired data throughout for the user:
combine the spread first encoded portion of data with the spread second encoded portion of data to generate a chip-block; and
initiate a transmission of the chip-block via the antenna.

14. A system according to claim 13, wherein the code group assigned to the user includes spreading codes that are orthogonal to spreading codes included in one or more other code groups assigned to one or more other users.

15. A system according to claim 13, wherein the logic configured to encode the first portion of data in the first encoded portion of data and encode the second portion of data in the second encoded portion of data comprises logic that, when executed by a hardware processor, is configured to encode the first and the second portions of data using one of space-time block codes, space-time trellis codes, layered space-time codes, concatenated codes, unitary space-time codes or differential space-time codes.

16. A computer program product comprising a non-transitory medium having instructions for receiving data at a receiver configured to receive via code division multiple access, which, when executed by logic, cause the logic to:
receive a chip-block that includes a first encoded portion of data and a second encoded portion of data that have been spread based on a first spreading code and a second spreading code,
wherein the first spreading code and the second spreading code are correlated to each other and are both included in a code group assigned to the user, and
wherein a number of spreading codes are included in the code group assigned to the user, the number to be based, at least in part, on a desired data throughput for the user;
de-spread the first encoded portion of data using the first spreading code;
de-spread the second encoded portion of data using the second spreading code;
decode a first portion of data included in the first encoded portion of data; and
decode a second portion of data included in the second encoded portion of data, wherein the first portion of data and the second portion of data are decoded based, at least in part, on a correlation coefficient associated with the highly correlated first and second spreading codes.

17. A computer program product according to claim 16, wherein the code group assigned to the user includes spreading codes that are orthogonal to spreading codes included in one or more other code groups assigned to one or more other users.

18. A computer program product according to claim 16, wherein the instruction to cause the logic to decode the first portion of data in the first encoded portion of data and decode the second portion of data in the second encoded portion of data comprises the instructions to further cause the logic to decode the first and second portions of data using a corresponding decoding algorithm for a respective coding scheme employed at transmitter that transmitted the chip-block, the decoding algorithm to include one of space-time block codes, space-time trellis codes, layered space-time codes, concatenated codes, unitary space-time codes or differential space-time codes.

19. A computer program product according to claim 16, wherein the instruction to cause the logic to decode the first portion of data in the first encoded portion of data and decode the second portion of data in the second encoded portion of data comprises the instructions to further cause the logic to decode the first and the second encoded portions of data jointly.

* * * * *

UNITED STATES PATENT AND TRADEMARK OFFICE
CERTIFICATE OF CORRECTION

Page 1 of 2

PATENT NO. : 8,867,515 B2
APPLICATION NO. : 13/503624
DATED : October 21, 2014
INVENTOR(S) : Duman It is certified that error appears in the above-identified patent and that said Letters Patent is hereby corrected as shown below:

On the Title Page

In Item (56), under "FOREIGN PATENT DOCUMENTS", in Column 2, Line 2, delete "WO 2008062163 A2 5/2008".

Illustrative Figure, delete Tag "(760)" and insert Tag -- (770) --, therefor.

Illustrative Figure, delete Tag "(770)" and insert Tag -- (760) --, therefor.

Illustrative Figure, in Box "(715)", in Line 1, delete "Controler" and insert -- Controller --, therefor.

In the Drawings

In Fig. 7, Sheet 7 of 7, delete Tag "(760)" and insert Tag -- (770) --, therefor.

In Fig. 7, Sheet 7 of 7, delete Tag "(770)" and insert Tag -- (760) --, therefor.

In Fig. 7, Sheet 7 of 7, in Box "(715)", in Line 1, delete "Controler" and insert -- Controller --, therefor.

In the Specification

In Column 1, below Title, insert -- CROSS REFERENCE TO RELATED APPLICATION
The present application is a U.S. national stage filing under 35 U.S.C. §371 of International Application No. PCT/US2011/037198, filed on May 19, 2011, the entire contents of which are incorporated herein by reference. --.

Signed and Sealed this
Ninth Day of June, 2015

Michelle K. Lee
*Director of the United States Patent and Trademark Office*

CERTIFICATE OF CORRECTION (continued)
U.S. Pat. No. 8,867,515 B2

In Column 2, Line 56, delete "codes" and insert -- codes. --, therefor.

In Column 4, Line 48, delete "receiver 110" and insert -- receiver 120 --, therefor.

In Column 9, Line 63, delete "receiver 110" and insert -- receiver 120 --, therefor.

In Column 10, Line 17, delete "network 120" and insert -- network 100 --, therefor.

In Column 10, Line 30, delete "feature 214)." and insert -- feature 314). --, therefor.

In Column 10, Line 37, delete "feature 216)." and insert -- feature 316). --, therefor.

In Column 10, Line 54, delete "feature 212)." and insert -- feature 312). --, therefor.

In the Claims

In Column 15, Line 26, in Claim 1, delete "user;" and insert -- user: --, therefor.

In Column 15, Line 39, in Claim 2, delete "portions" and insert -- portion --, therefor.

In Column 16, Line 4, in Claim 6, delete "user;" and insert -- user: --, therefor.

In Column 16, Line 46, in Claim 10, delete "throughout" and insert -- throughput --, therefor.

In Column 17, Line 19, in Claim 13, delete "throughout" and insert -- throughput --, therefor.

In Column 18, Line 7, in Claim 16, delete "user;" and insert -- user: --, therefor.